UNITED STATES PATENT OFFICE.

NEWTON L. CARTER, OF SHAMROCK, TEXAS.

CATTLE FEED.

1,184,228. Specification of Letters Patent. Patented May 23, 1916.

No Drawing. Application filed February 19, 1916. Serial No. 79,264.

*To all whom it may concern:*

Be it known that I, NEWTON L. CARTER, a citizen of the United States, residing at Shamrock, in the county of Wheeler and State of Texas, have invented certain new and useful Improvements in Cattle Feed, of which the following is a specification.

My invention has relation to an improvement in pressed cakes for cattle feed and in such connection it relates more particularly to the combination of materials in required proportions to constitute the cake and to the steps whereby the raw materials are combined to produce the cake of proper density, food value and form.

In the carrying out of my invention in so far as the product is concerned the materials used and the proportions required are as follows: grain, such as Kafir corn or maize, 70% and upward; cotton seed, 20% and downward; molasses, 10% and downward; and water if required to permit the mass to be thoroughly cooked under steam heat.

The method of preparing the cakes is as follows: The grain is first ground to an impalpable powder and mixed with the cotton seed meal. Molasses and water are then added and the mass thoroughly mixed and then cooked in a closed receptacle by steam heat for approximately twenty minutes or until the grain and cotton seed meal are thoroughly cooked. While still hot and relatively plastic the mass is placed in a press or mold and compressed to a relatively thin sheet or cake. The sheet or cake is then allowed to cool and harden and when used as feed is broken up into small pieces either by hand or by machinery and thrown upon the ground. The smaller fragments or crumbs resulting from the breaking operation may be fed to the stock from a trough.

So far as I am aware I am the first to combine the grain and cotton seed meal when cooked into a cake and to feed the same to the stock from the grass or ground. Where as heretofore the loose materials were fed, say to cattle, from a trough a large proportion of the feed was scattered and not eaten and when loose materials were scattered upon the ground they readily absorbed moisture and were not then desired by the stock. I believe therefore that I have discovered a new feed for cattle composed of old elements or ingredients but so combined as to form a solid cake which when broken up makes an excellent ground or grazing feed and I therefore desire to claim the same broadly irrespective of proportions inasmuch as these proportions may be varied to suit the price to be paid for the feed. The greater proportion of cotton seed meal in the cake the richer the food and the more expensive will be the food.

Having thus described the nature and objects of my invention, what I claim as new and desire to secure by Letters Patent, is—

1. A cattle food consisting of approximately seven parts maize ground to an impalpable powder, two parts cotton seed meal and one part molasses, thoroughly mixed together and cooked, and pressed into a relatively hard cake.

2. A cattle food consisting of a relatively large proportion of maize ground to an impalpable powder, and a relatively small proportion of cotton seed meal and molasses thoroughly mixed together, then cooked and pressed into a relatively hard cake.

In testimony whereof I have signed my name to this specification in the presence of two subscribing witnesses.

NEWTON L. CARTER.